US009311935B2

(12) United States Patent
Clinton et al.

(10) Patent No.: US 9,311,935 B2
(45) Date of Patent: Apr. 12, 2016

(54) METHOD AND APPARATUS FOR MAGNETIC RECORDING HEAD HAVING A WAVEGUIDE

(71) Applicant: HGST Netherlands B.V., Amsterdam (NL)

(72) Inventors: Thomas William Clinton, Danville, CA (US); Kanaiyalal Chaturdas Patel, Fremont, CA (US); Vijay Prakash Singh Rawat, San Jose, CA (US); Sue Siyang Zhang, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/074,408

(22) Filed: Nov. 7, 2013

(65) Prior Publication Data

US 2015/0122772 A1 May 7, 2015

(51) Int. Cl.
*G11B 5/31* (2006.01)
*G11B 5/60* (2006.01)
G11B 5/00 (2006.01)

(52) U.S. Cl.
CPC .............. *G11B 5/314* (2013.01); *G11B 5/3163* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| 7,710,686 | B2 | 5/2010 | Kim et al. |
| 8,045,832 | B2* | 10/2011 | Pan et al. ........................ 385/43 |
| 8,169,881 | B2 | 5/2012 | Balamane et al. |
| 8,225,482 | B2 | 7/2012 | Suh et al. |
| 8,270,257 | B2 | 9/2012 | Lille |
| 8,270,261 | B2 | 9/2012 | Komura et al. |
| 8,325,566 | B2 | 12/2012 | Shimazawa et al. |
| 8,351,308 | B2 | 1/2013 | Chou et al. |
| 8,358,565 | B2 | 1/2013 | Komura et al. |
| 9,183,854 | B2* | 11/2015 | Wan ........................ G11B 5/314 |
| 2002/0134671 | A1* | 9/2002 | Demaray et al. .......... 204/192.25 |
| 2003/0063883 | A1* | 4/2003 | Demaray et al. .............. 385/129 |
| 2006/0037364 | A1* | 2/2006 | Chang et al. .................... 65/386 |
| 2007/0090089 | A1* | 4/2007 | Chang et al. .................... 216/41 |

(Continued)

OTHER PUBLICATIONS

Takano et al., "Optical design challenges of thermally assisted magnetic recording heads," IEEE Transactions on Magnetics (Mar. 2010) 46 (3): 744-750.

(Continued)

*Primary Examiner* — Allan Olsen
(74) *Attorney, Agent, or Firm* — Patterson & Sheridan, LLP

(57) ABSTRACT

A method of forming a wave guide for a heat assisted magnetic recording slider of a disk drive includes depositing a layer of waveguide material onto a substrate, and depositing a layer of a hard mask material onto the waveguide material. The method then includes depositing a layer of photoresist onto the hard mask material, and exposing the photoresist to produce a hard mask pattern that includes a waveguide pattern. The method also includes stripping the photoresist material leaving the hard mask pattern having a first line edge roughness. The method also includes removing the waveguide material not covered by the hard mask, the waveguide having sidewalls which having a line edge roughness which is substantially equal to the first line edge roughness. Also disclosed is an apparatus for accomplishing the method.

18 Claims, 8 Drawing Sheets

(56) References Cited

U.S. PATENT DOCUMENTS

| | | | |
|---|---|---|---|
| 2007/0263973 A1* | 11/2007 | Van Laere | G02B 6/124 385/129 |
| 2008/0253728 A1* | 10/2008 | Sparacin et al. | 385/132 |
| 2012/0205785 A1* | 8/2012 | Bouet et al. | 257/632 |
| 2012/0288228 A1* | 11/2012 | Saito et al. | 385/14 |
| 2013/0082027 A1* | 4/2013 | Mao et al. | 216/22 |

OTHER PUBLICATIONS

Watcharakitchakorn et al., "Optical field enhancement for heat-assisted magnetic recording system using photonic crystal waveguide," 2012 International Conference on Electromagnetics in Advanced Applications (ICEAA) (Sep. 2-7, 2012): 442-445.

* cited by examiner

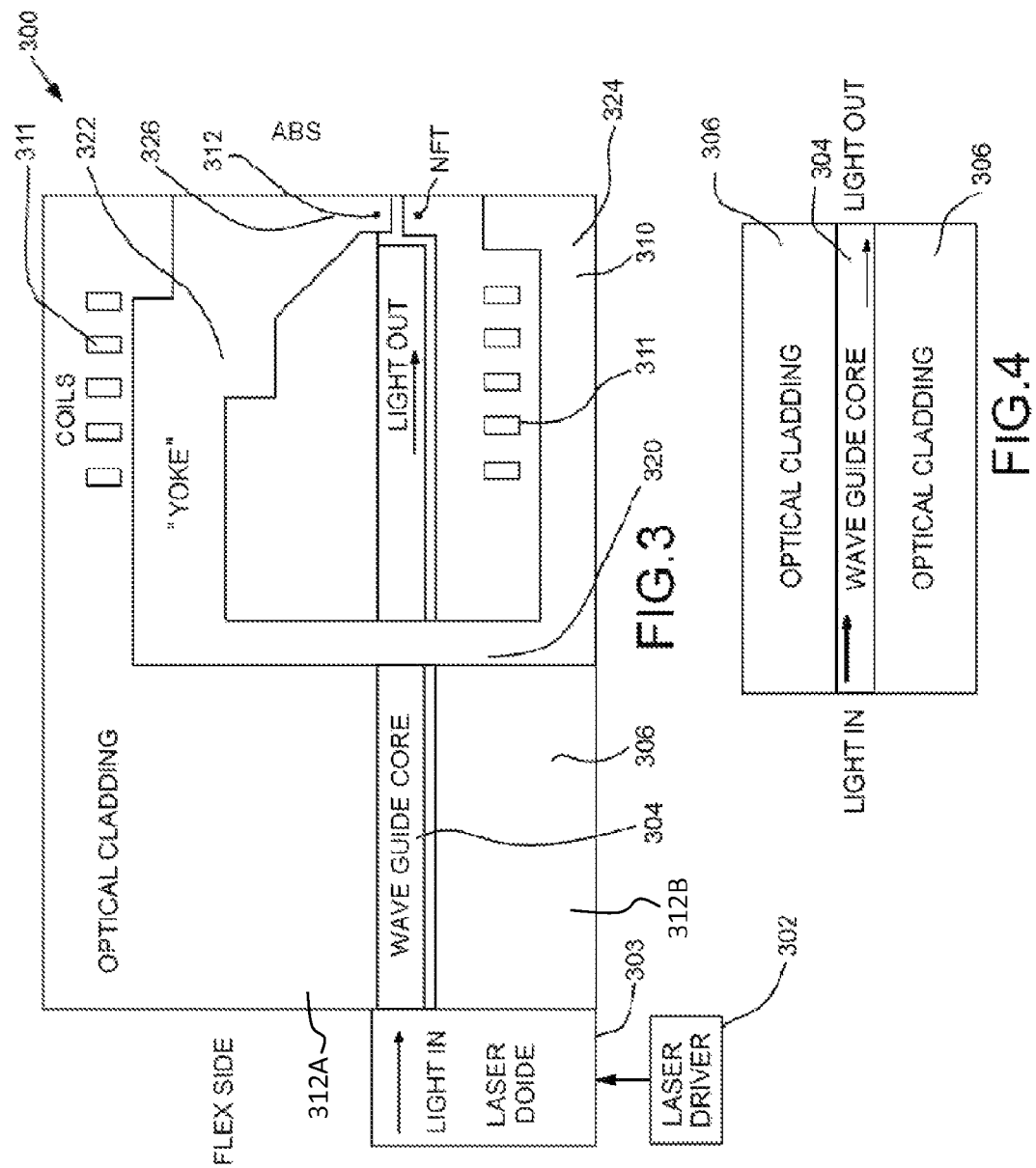

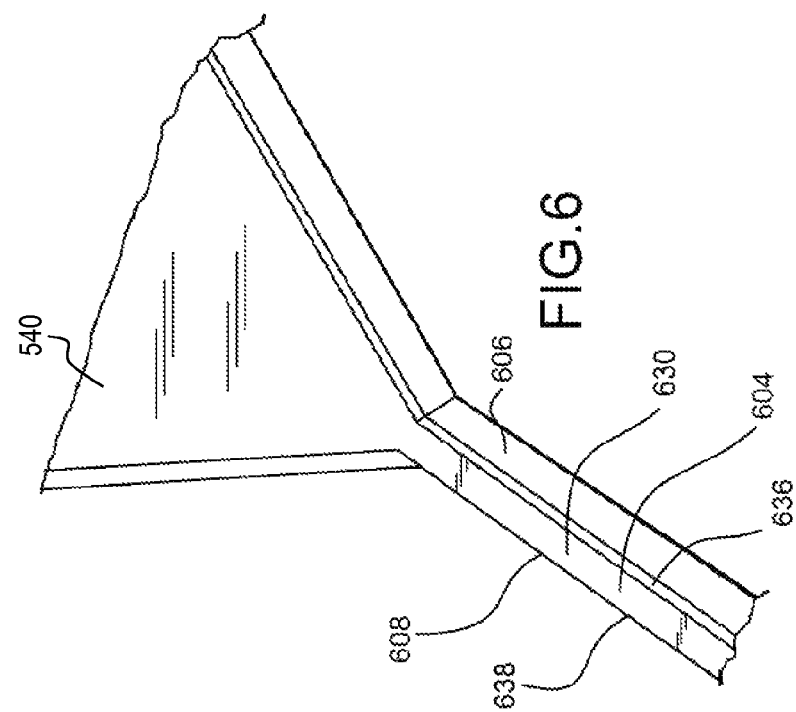
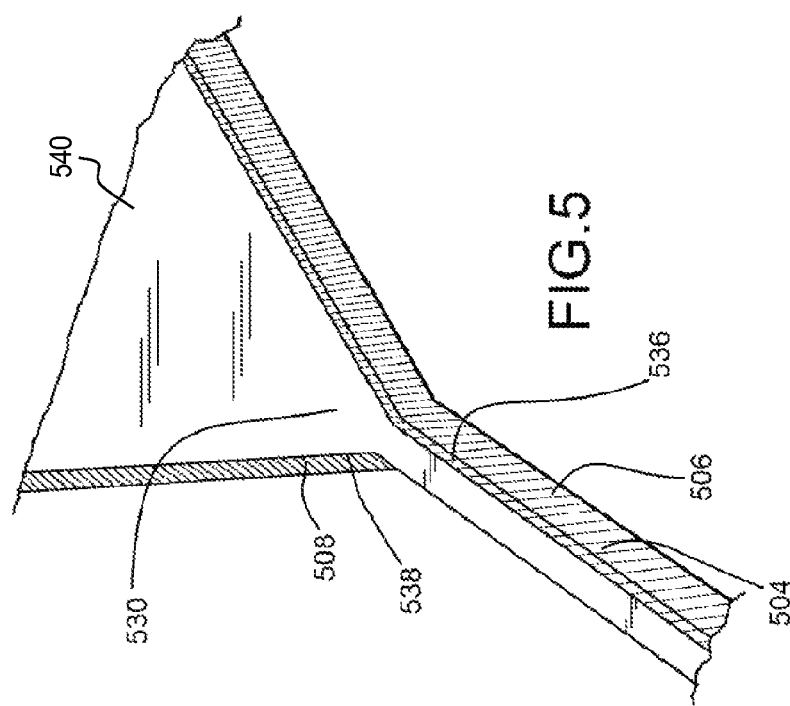

METHOD AND APPARATUS FOR MAGNETIC RECORDING HEAD HAVING A WAVEGUIDE

TECHNICAL FIELD

This disclosure relates to data storage devices, and more particularly to a storage device having magnetic recording head having a waveguide, and a method for making the same.

BACKGROUND

Data storage devices can be incorporated into a wide range of devices, including large scale data centers, laptop or desktop computers, tablet computers, digital video recorders, set-top boxes, digital recording devices, digital media players, video gaming devices, video game consoles, cellular telephones, and the like. Data storage devices may include hard disk drives (HDD). HDDs include one or multiple magnetic disks having positive or negative areas of magnetization. A bit of data may be represented according to a defined area of magnetization, which may be referred to as a bit cell or magnetic element. Blocks of data are arranged to form tracks on a rotating disk surface. A magnetic transducer may be used to read data from the disk. Different magnetic recording techniques may be used to store data to the disk. Magnetic recording techniques include, for example, longitudinal magnetic recording (LMR), perpendicular magnetic recording (PMR), and shingled magnetic recording (SMR). Heat assisted magnetic recording (HAMR) may be used with LMR, PMR, or SMR.

To increase the areal density of a disk the size of magnetic elements may be reduced. However, smaller magnetic elements may be thermally unstable (i.e., erased due to ambient temperature fluctuations). In order to have smaller magnetic elements that maintain their state at room temperature, the smaller magnetic elements can be composed of high coercivity material. However, it may be difficult to write data to high coercive materials at room temperature using the magnetic field produced by a recording head. HAMR is a magnetic recording technique that allows data to be written to a magnetic disk composed of small high coercive magnetic elements by increasing the temperature of a magnetic element on the disk as the bits of data are written. Thus, HAMR may allow for higher areal densities than conventional LMR, PMR and SMR. HAMR may also be referred to as thermally assisted (magnetic) recording (TAR or TAMR), or energy assisted magnetic recording (EAMR).

SUMMARY

In general, this disclosure describes techniques for storing data. In particular, this disclosure describes techniques for improving recording during HAMR by forming a wave guide that transfers energy more efficiently to the magnetic elements on the disk. The energy transferred by the wave guide is used to selectively heat portions of a disk during a write operation.

According to one example of the disclosure, a method of forming a wave guide for a heat assisted magnetic recording slider of a disk drive includes depositing a layer of waveguide material onto a substrate, and depositing a layer of a hard mask material onto the waveguide material. The method also includes depositing a layer of photoresist onto the hard mask material, and exposing the photoresist to produce a hard mask pattern that includes a waveguide pattern. The method also includes, selectively etching the hard mask layer and stripping the photoresist material to produce a hard mask (HM) with line edge roughness (LER) limited only by the photo process used. In other words, the HM has a LER that is substantially equal to the LER of the photoresist used to define the HM. For example, resist materials noted in the industry, such as DURIMIDE® (available from Fujifilm Electronic Materials Co., Ltd of Tokyo, Japan) and HSQ (available from Tokyo Ohka Kogyo Co., Ltd of Tokyo, Japan), for having a low LER can be used as the photoresist on the HM. The HM would have a LER substantially the same as the photoresist used to define the HM. Another selective etch removes the waveguide material not covered by the hard mask, resulting in a waveguide having sidewalls with a line edge roughness comparable to that of DURIMIDE®, HSQ, or the like. In one embodiment, the waveguide can have a LER in a range of 0.1-3.0 σ deviation of a line edge from a straight line. In some embodiments, hard mask material is amorphous. In still other embodiments the hard mask material is a non-crystalline solid. In one embodiment, the hard mask material is AlO. The method also includes optically cladding the waveguide material. The hard mask material can be removed before cladding. In another embodiment, the cladding material is substantially the same as the hard mask and so the hard mask is not removed before optically cladding. In one embodiment, the material used to optically clad the waveguide material is AlO. The method also includes forming a write head proximate the waveguide material.

According to another example of the disclosure, a method of forming a waveguide for a heat assisted magnetic recording slider of a disk drive includes depositing a layer of waveguide material onto a substrate, and depositing a layer of a non-crystalline solid material onto the waveguide material. A layer of photoresist is then deposited onto the non-crystalline solid material. The photoresist is patterned with a waveguide pattern by exposing the photoresist to produce the waveguide pattern. Removing the photoresist material not associated with the waveguide pattern, and removing an exposed portion of the non-crystalline solid material forms the hard mask for the waveguide. The non-crystalline solid material is removed using a selective etching process, such as reactive ion etching. The non-crystalline solid material that forms the hard mask has a line edge roughness as good as achievable with the best known resist materials, such as DURIMIDE® and HSQ. Another selective etching process is used to remove the waveguide material not protected by the hard mask to form a waveguide having sidewalls with a line edge roughness defined by the hardmask. According to yet another example of the disclosure, an apparatus for forming a wave guide for a heat assisted magnetic recording slider of a disk drive includes means for depositing a layer of waveguide material onto a substrate, and means for depositing a layer of a hard mask material onto the waveguide material. The apparatus also includes means for depositing a layer of photoresist onto the hard mask material, and means for exposing the photoresist to produce a hard mask pattern that includes a waveguide pattern. The apparatus also includes means for stripping the photoresist material, and selectively etching the hard mask layer to produce a hard mask having edges with a line edge roughness as good as achievable with the best known resist materials, such as DURIMIDE® and HSQ. In one embodiment, the waveguide can have a LER in a range of 0.1-3.0 σ deviation of a line edge from a straight line. The apparatus also includes means for removing the waveguide material not covered by the hard mask, the waveguide having sidewalls which having a line edge roughness defined by the hardmask.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a conceptual diagram illustrating a cross-sectional view of a HAMR head in an example slider, according to an example embodiment.

FIG. 4 is a conceptual diagram illustrating a cross-sectional view of a waveguide in a HAMR head, according to an example embodiment.

FIG. 5 is an illustration of a waveguide formed using a Cr hard mask.

FIG. 6 is an illustration of a waveguide formed using an AlO hard mask, according to an example embodiment.

DETAILED DESCRIPTION

A HAMR recording head within a slider may use laser beams and/or near-field optical sources to heat a storage medium during recording. The amount of optical interference in the light delivery path of HAMR heads affects the heating temperature profile of the media, and hence the recording quality during HAMR recording. Forming the light delivery path to reduce interference increases the optical efficiency associated with the optical path so that additional power can be delivered to the magnetic element on the surface of the disk thereby improving HAMR recording quality, and reliability.

Some techniques that can be used in forming the light delivery path to reduce interference include forming an optical waveguide with smooth sidewalls. This disclosure describes techniques for forming an optical waveguide with smooth sidewalls and includes a technique of forming a hardmask having smooth edges over a layer of light transmissive material. The hardmask is left in place as light transmissive material is removed to form the light delivery path or optical waveguide. The hardmask with smooth edges results in a waveguide with substantially smooth edges.

Figure 1:
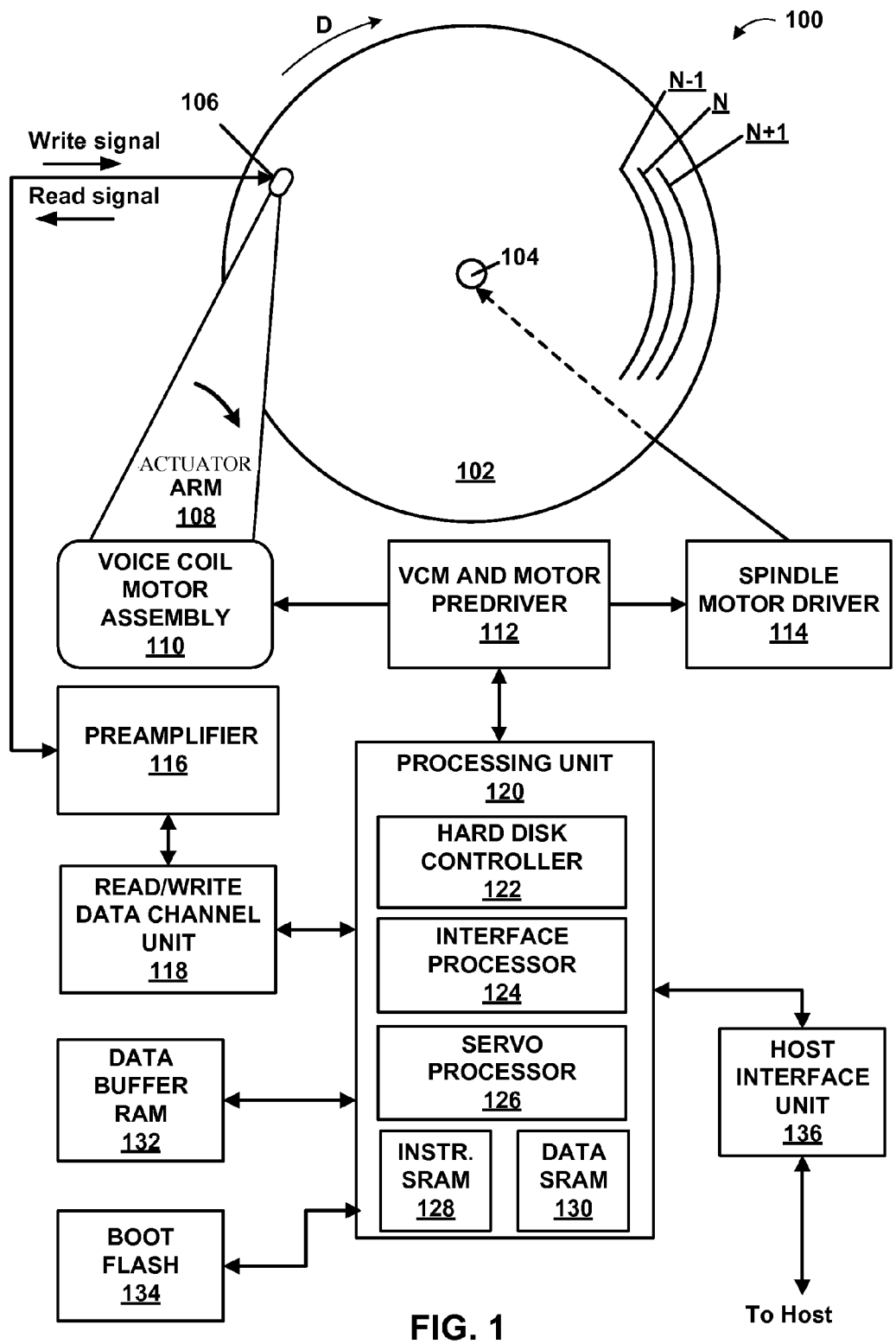
FIG. 1 is a conceptual diagram illustrating an example hard disk drive that uses the instant invention, according to an example embodiment.

FIG. 1 is a conceptual diagram illustrating an example hard disk drive that utilizes the apparatus and methods described in this disclosure. Disk drive 100 is operably coupled to a host device as an internal or external data storage device. A host device can include, for example, a laptop or desktop computer or a similar device. Disk drive 100, includes data recording disk or medium 102, spindle assembly 104, slider 106, actuator arm 108, voice coil motor assembly 110, VCM and motor predriver 112, spindle motor driver 114, preamplifier 116, read/write data channel unit 118, processing unit 120, data buffer RAM 132, boot flash 134, and host interface unit 136. Processing unit 120 includes hard disk controller 122, interface processor 124, servo processor 126, instruction SRAM 128, and data SRAM 130. It should be noted that although example hard disk drive 100 is illustrated as having distinct functional blocks, such an illustration is for descriptive purposes and does not limit hard disk drive 100 to particular hardware architecture. In a similar manner, processing unit 120 should not be limited to a particular hardware architecture based on the example illustrated in FIG. 1. Functions of hard disk drive 100 may be realized using any combination of hardware, firmware, and/or software implementations.

Disk 102 includes a stack of one or more disks having magnetic material deposited on one or both sides thereof. Disk 102 is composed of a light aluminum alloy, ceramic/glass, or other suitable substrate that magnetic material may be deposited thereon. Using electromagnetic techniques, data may be stored on disk 102 by magnetically orientating an area of the magnetic material on the disk. Data stored on disk is organized as data blocks. Data blocks are typically 512 bytes or 4 KB in size, but may be other sizes. The data written to disk 102 is arranged into a set of radially-spaced concentric tracks, illustrated in FIG. 1 as N−1, N, and N+1. A data block may be located within a sector of a particular track. In some other disk drives, the data is written on a spiral track that begins near the inner diameter of the disk and ends near the outer diameter of the disk.

Magnetic material of disk 102 may be configured according to a plurality magnetic recording techniques. Examples of magnetic recording techniques include longitudinal magnetic recording (LMR) and perpendicular magnetic recording (PMR). Additional magnetic recording techniques include shingled magnetic recording (SMR) and heat assisted magnetic recording (HAMR). SMR is a type of PMR where tracks are written in a partially overlapping manner. As described above, HAMR may be used in conjunction with LMR, PMR, or SMR techniques to achieve higher areal storage density.

As illustrated in FIG. 1, disk 102 is coupled to spindle assembly 104 and rotates in direction D about a fixed axis of rotation. Disk 102 may be rotated at a constant or varying rate. Typical rates of rotation range from less than 3,600 to more than 15,000 revolutions per minute. However, disk 102 may be rotated at higher or lower rates and the rate of rotation may be determined based on a magnetic recording technique. Spindle assembly 104 includes a spindle and a motor and is coupled to spindle motor driver 114. Spindle motor driver 114 provides an electrical signal to spindle assembly 104 and the rate at which the spindle rotates, and thereby disk 102, is proportional to the voltage or current of the electrical signal. Spindle motor driver 114 is coupled to VCM and motor predriver 112. VCM and motor predriver 112 are configured to use feedback techniques to insure disk 102 rotates at a desired rate. For example, VCM and motor predriver 112 may be configured to receive current and/or voltage signals from the motor and adjust the electrical signal provided to spindle motor driver 114 using feedback circuits that implement a feedback control loop.

As illustrated in FIG. 1, VCM and motor predriver 112 is also coupled to voice coil motor assembly 110. In addition to providing an electrical signal to spindle motor driver 114, VCM and motor predriver 112 is also configured to provide an electrical signal to voice coil motor assembly 110. Voice coil motor assembly 110 is operably coupled to actuator arm 108 such that actuator arm 108 pivots based on the current or voltage of the electrical signal received from VCM and motor predriver 112. As illustrated in FIG. 1, slider 106 is coupled to actuator arm 108. Thus, VCM and motor predriver 112 adjusts the position of slider 106 with respect to disk 102. VCM and motor predriver 112 may use feedback techniques to insure slider 106 maintains a desired position with respect to disk 102. In one example, VCM and motor predriver 112 includes an analog-to-digital converter to monitor electromagnetic fields and current from voice coil motor assembly 110.

Slider 106 is configured to read and write data to disk 102 according to a magnetic recording technique, for example, any of the example magnetic recording techniques described above. Slider 106 may include read and write heads corresponding to each of a plurality of disks included as part of disk 102. Further, slider 106 may include one or more read and write heads for each disk. Slider 106 is coupled to preamplifier 116. Preamplifier 116 may also be referred to as arm electronics (AE). Preamplifier 116 is configured to select a correct head from a plurality of heads for a particular read or write operation. The correct head is the head associated with the transducer that is being passed over the disk where information representing data is to be written or stored. Preamplifier 116 is configured to drive head 106 with a write current, during a write operation. Further, preamplifier 116 is configured to amplify read signals from slider 106, during a read operation using a programmable head bias current. Preamplifier 116 may also be configured to detect errors during each of the read and write operations. Preamplifier 116 may also include a signal adaptive filter (SAF) for thermal asperity (TA) recovery during a read operation.

Preamplifier 116 receives data to be written to disk 102 from read/write data channel unit 118. Preamplifier 116 provides data read from disk 102 to read/write data channel unit 118. Data may originate from a host device and may be communicated to read/write data channel unit 118 via host interface unit 136 and processing unit 120. Host interface unit 136 provides a connection between hard disk drive 100 and a host device. Host interface unit 136 may operate according to a physical and logical characteristics defined according to a computer bus interface. Example standardized interfaces include ATA (IDE, EIDE, ATAPI, UltraDMA, SATA), SCSI (Parallel SCSI, SAS), Fibre Channel, and PCIe (with SOP or NVMe).

As illustrated in FIG. 1, processing unit 120 includes hard disk controller 122, interface processor 124, servo processor 126, instruction SRAM 128, and data SRAM 130. Instruction SRAM 128 can store a set of operation instructions for processing unit 120. Instructions can be loaded to instruction SRAM 128 from boot flash 134 when hard disk drive 100 is powered on. Data SRAM 130 and data buffer RAM 132, which is coupled to processing unit 120 are configured to buffer blocks of data during read and write operations. For example, blocks of data received from host interface unit 136 may be sequentially stored to data SRAM 130 and data buffer RAM 132 before the data blocks are written to disk 102. It should be noted that although instruction SRAM 128, data SRAM 130, data buffer RAM 132, and boot flash 134 are illustrated as distinct memory units, the functions of instruction SRAM 128, data SRAM 130, data buffer RAM 132, and boot flash 134 may be implemented according to other types of memory architectures.

Hard disk controller 122 generally represents the portion of processing unit 120 configured to manage the transfer of blocks of data to and from host interface unit 136 and read/write data channel unit 118. Hard disk controller 122 is configured to perform operations to manage data buffering and interfaces with host interface unit 136 according to a defined computer bus protocol, as described above. For example, hard disk controller 122 can receive and parse packets of data from host interface unit 136. Further, hard disk controller 122 may be configured to communicate with host. For example, hard disk controller 122 may be configured to report errors to host and format disk 102 based on commands received from host.

Interface processor 124 generally represents the portion of processing unit 120 configured to interface between servo processor 126 and hard disk controller 122. Interface processor 124 may perform predictive failure analysis (PFA) algorithms, data recovery procedures, report and log errors, perform rotational positioning ordering (RPO) and perform command queuing. In one example, interface processor can be an ARM processor.

As described above, data is typically written to or read from disk 102 in blocks which are contained within a sector of a particular track. Disk 102 may also include one or more servo sectors within tracks. Servo sectors may be circumferentially or angularly-spaced and may be used to generate servo signals. A servo signal is signal read from disk 102 that is used to position the slider 106 with a particular sector or track of disk 102. Servo processor 126 generally represents the portion of processing unit 120 configured to control the operation of spindle assembly 104 and voice coil motor assembly 110 to insure slider 106 is properly positioned with respect to disk 102. Servo processor 126 can be referred to as a Servo Hardware Assist Real-time Processor (SHARP). Servo processor 126 may be configured to provide closed loop control for all combinations of: slider position on track, slider seeking, slider settling, spindle start, and spindle speed. Further, servo processor 126 may include a set of instructions to calculate servo related variables.

Figure 2:
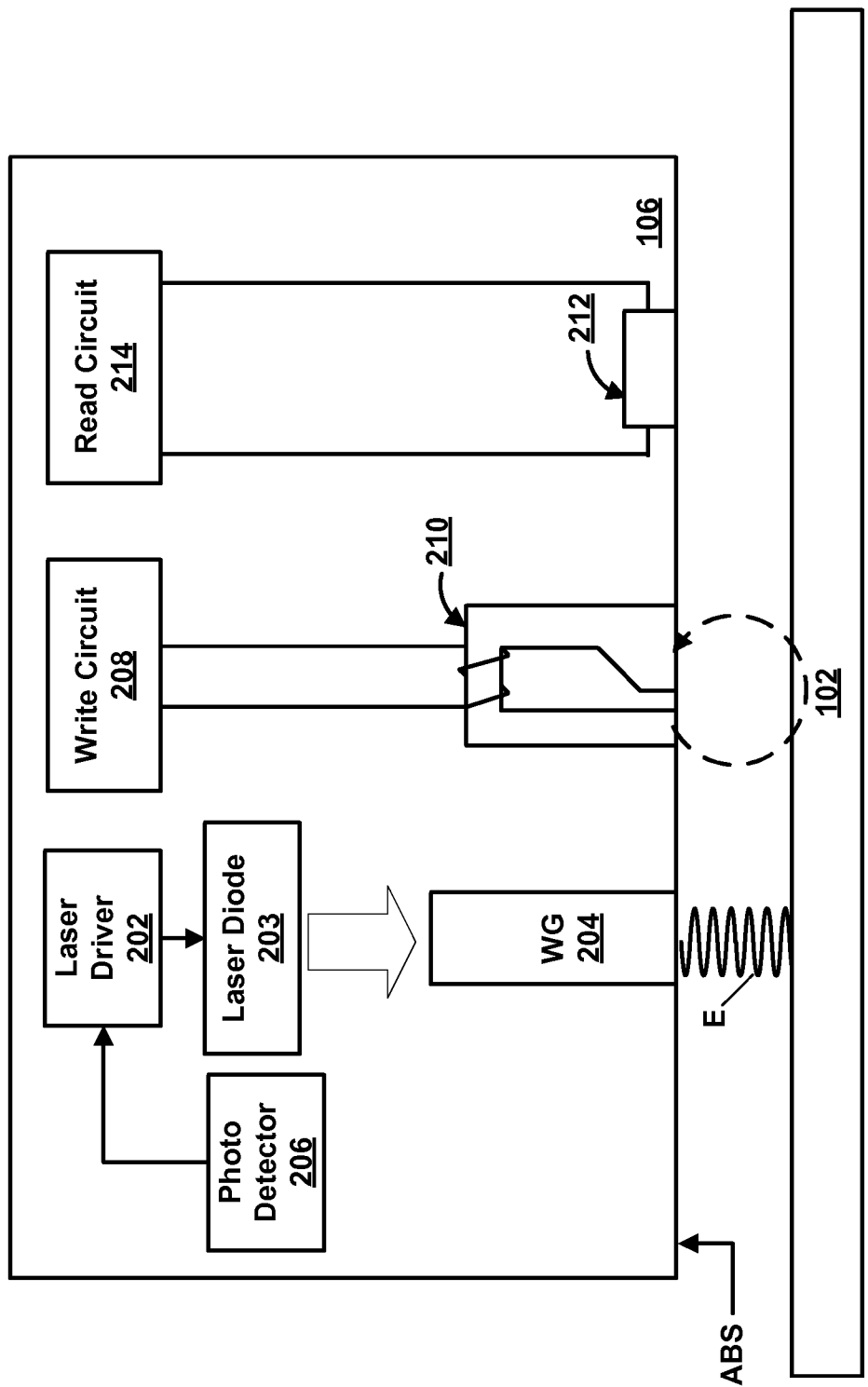
FIG. 2 is a conceptual diagram illustrating an example slider that uses the instant invention, according to an example embodiment.

FIG. 2 is a conceptual diagram illustrating an example slider that may utilize techniques described in this disclosure. It should be noted that for ease of description, components illustrated in FIG. 2 are not to scale and the relative position of elements as illustrated in FIG. 2 may not necessarily reflect the actual position of the elements in a constructed slider. Slider 106 is an example of a slider that records data to disk 102 using HAMR. Slider 106 may be fabricated using a composite material, such as, for example, a composite of alumina/titanium-carbide ($Al_2O/TiC$). As illustrated in FIG. 2, slider 106 includes a laser driver 202, a laser diode 203, a waveguide 204, a photodetector 206, a write circuit 208, a write transducer 210, a read transducer 212, and a read circuit 214.

The surface of slider 106 that is adjacent to disk 102 is referred to as the Air Bearing Surface (ABS). As described above, HAMR is a magnetic recording technique that allows data to be written to a magnetic disk including high anisotropy magnetic elements by increasing the temperature of a magnetic element during recording. As illustrated in FIG. 2, electromagnetic energy E is emitted from slider 106 through the ABS onto the surface of disk 102, thereby heating the surface of disk 102. More specifically, the electromagnetic energy E is emitted from the waveguide 204. The surface of disk 102 may be composed of high anisotropy magnetic elements including for example, a cobalt-chromium (CoCr) alloy granular layer grown on a special growth-enhancing sublayer, or a multilayer of alternating films of Co with films of platinum (Pt) or palladium (Pd). The surface of disk 102 may also include $L1_0$ ordered alloy, such as FePt or FeNiPt.

As described above, disk 102 may include a plurality of adjacent and in some instances partially overlapping data tracks (e.g., SMR tracks). Waveguide 204 is configured to focus electromagnetic energy E onto a specific track where data is to be written in a manner that minimizes the heating of adjacent tracks. In the example illustrated in FIG. 2, waveguide 204 receives electromagnetic radiation from laser diode 203 and includes an optical waveguide and a near field transducer. However, it should be noted that in other examples, laser diode 203 may be any type of electromagnetic radiation source and waveguide 204 may be configured to focus the electromagnetic radiation emitted by the source to a particular data area of disk 102. In some examples, laser diode 203 may be a InP based, GaAs based, or GaN based diode. In some examples, the wavelength of the laser light emitted from laser diode 203 may be within the range of approximately 375 nm (nanometers) to 1700 microns. For example, a laser diode 203 may be configured to emit laser light with a wavelength of approximately 800 nm.

Laser driver 202 is configured to provide power to laser diode 203. That is, laser driver 202 may provide a current to laser diode 203 and the power of laser light emitted by laser diode 203 may be proportional to the current according to operating parameters of the laser diode 203. As described above, the optical power in the light delivery path of HAMR heads affects the recording quality during HAMR recording. In some cases, laser diode 203 power variations may be due to ambient temperature variation. Further, excessive temperatures may damage and reduce the useful life of components of slider 106. For example, the quantum efficiency of laser diode 203 may decrease due to aging of the semiconductor material caused by excessive temperatures. As illustrated in FIG. 2, laser driver 202 is coupled to photodetector 206. Photodetector 206 is configured to determine the electromagnetic power delivered to the ABS through its optical absorption. Photodetector 206 provides feedback to laser driver 202 such that laser driver 202 may adjust the power of laser light emitted by laser diode 203. This feedback control permits the disk drive 100 to perform HAMR at a sufficient temperature without damaging or prematurely aging components of slider 106. In one example, when a power change is measured from the photodetector 203, the current provided to laser diode 202 can be changed to compensate this power change. For example, the bias current provided to laser diode 203 from laser driver 202 can be increased to compensate for a power change.

Write transducer 210 is configured to produce a magnetic flux in response to a current received from write circuit 208. Write circuit 208 may be coupled to preamplifier 116. As illustrated in FIG. 2, a coil extending from write circuit 208 is wrapped around write transducer 210. Write transducer 210 includes a write pole formed of conventional high-moment material, such as a NiFe or FeCoNi. When write-current pulses are directed from write circuit 208 through the coil the write transducer 210 directs magnetic flux, represented by arrow, to disk 102. The magnetic flux causes data to be recorded to disk 102. Write circuit 208 works in conjunction with laser driver 202 such that magnetic flux is directed at disk 102 when disk has been heated to a desired temperature for HAMR recording. In some embodiments, the write transducer 210 is a thin film head.

Read transducer 212 includes a magnetoresistive read sensor configured to detect a magnetic field from disk 102. The magnetoresistive read sensor may be, for example, a tunneling magneto resistive (TMR) sensor, a current-in-plane giant magnetoresistive (CIP-GMR) sensor, or a current-perpendicular-to-plane giant magnetoresistive (CPP-GMR) sensor. Read circuit 214 is configured to reproduce data from the read transducer 212 and may include an amplifier and a demodulator. Read circuit 214 may be coupled to preamplifier 116. In some examples, preamplifier 116 may perform amplification and demodulation. In this manner, slider 106 represents an example of a slider configured to record data to disk 102 using HAMR and retrieve recorded data from disk 102.

FIG. 3 is a conceptual diagram illustrating a cross-sectional view of a HAMR head 300 in a slider (not shown in this view), according to another example embodiment. The ABS (air bearing surface) is shown to orientate the HAMR head 300. The HAMR head 300 includes a write element 310 which is part of the write circuit. The write element includes a yoke 320 and a set of coils 311 that are wrapped around the yoke 320 of the write element. The yoke 320 further includes an upper yoke 322, a lower yoke 324 and a magnetic pole 326. The yoke 320 also includes a pole tip 312 that is adjacent a gap in the yoke 320. A waveguide 304 is substantially integrated into write transducer. The waveguide 304 that passes through a portion of the write element 310 and terminates proximate the pole tip 312 of the write element 310. The write element 310 has an opening therein (not shown) through which the waveguide 304 passes. The waveguide can be made of TaO, for example. The waveguide is surrounded with an optical cladding 306 that has an index of refraction which is less than the index of refraction of the waveguide 304. Light is passed through the waveguide 304. The light is provided by a laser diode 303 which is positioned at one end of the waveguide 304. More specifically, the laser diode is positioned on the end distant from the ABS or air bearing surface. The laser diode 303 is driven by laser driver 302 which is communicatively coupled to the laser diode 303. The end of the waveguide 304 distal from the ABS is also termed as the flex side of the HAMR head or transducer.

During a write operation, electrical energy is passed through the coil 311 to induce a magnetic flux in the write head and specifically at the pole tip 312. The write transducer 310 is configured to produce a magnetic flux in response to a current in the coil 311. Magnetic pole 326 is an example of a write pole and may be formed of a high-moment material, such as a CoFe, NiFe or FeCoNi alloys, or other high moment materials. Lower magnetic yolk 324 and upper magnetic yolk 322 are configured such that magnetic pole 326 directs a magnetic flux onto the disk in response to current in a coil (not shown) wrapped around lower magnetic yolk 324 and upper magnetic yolk 322. Further, lower magnetic yolk 324 and upper magnetic yolk 322 provide a return path for the magnetic flux. The magnetic flux proximate the pole tip 312 enters the disk to magnetize a portion of the disk. In the example illustrated in FIG. 3, lower magnetic yolk 324 acts as a return pole. The magnetic flux at the pole tip passes into the magnetizable disk (not shown) while the laser light passing through the waveguide produces energy which heats the portion of the disk being magnetized. The portion of the disc which is being magnetized is also referred to as the magnetic element.

As described above, waveguide 204 is configured to focus electromagnetic energy E (e.g., laser light) onto disk 102. The wave guide 304 is composed of a high-index-of-refraction dielectric material that is transmissive to radiation of a particular wavelength emitted by laser diode 303. For example, waveguide 304 may be composed of radiation-transmissive materials such $Ta_2O_5$ or $TiO_2$. Cladding material or cladding 306 is composed of materials with a lower refractive index than the waveguide 304. In this manner, electromagnetic radiation of a particular wavelength propagates through waveguide 304 based on the principles of optics. Cladding 312a and 312b may be composed of $Al_2O_3$ or $SiO_2$ or similar materials. In some examples, cladding material 306 may be configured to be transparent to particular frequencies of electromagnetic radiation. In some embodiments, the waveguide includes a near-field transducer (not shown) that may be a plasmonic device. The near field transducer focuses the beamspot of the electromagnetic radiation to avoid heating neighboring tracks of disk 102. The near-field transducer may create a beamspot smaller than the diffraction limit. The near-field transducer may operate with, for example, either a c-aperature, e-antenna plasmonic near-field source, or another shaped transducer. The composition of cladding material, the core, and near-field transducer is based on the wavelength of electromagnetic radiation emitted by a source. In one example, emitted electromagnetic radiation may include electromagnetic radiation with a wavelength within the visible spectrum (400-700 nm). In another example, emitted electromagnetic radiation may include electromagnetic radiation with a wavelength within the mid-infrared range (5-8 microns). In yet another example, emitted electromagnetic radiation may include electromagnetic radiation with a wavelength within the far-infrared range (15-1000 microns).

FIG. 4 is a conceptual diagram illustrating a cross-sectional view of a waveguide 304 in a HAMR head with the write element removed for the sake of clarity, according to an example embodiment. The waveguide 304 is surrounded by optical cladding material 306. The optical cladding material has an index of refraction which is higher than the index refraction of the waveguide 304. Laser light can be input to the waveguide as well as to the optical cladding material 306. As the light travels from the light input side to the light output or ABS of the HAMR head 300, the light migrates toward the waveguide 304. As a result the waveguide 304 concentrates the light as it travels from the light input side to the light output side of the HAMR head 300. The waveguide 304 is made of a relatively high index of refraction material such as TaO, and the optical cladding material is made of a relatively lower index every fraction material such as AlO. Of course, these materials are examples and similar materials could be used for the waveguide 304 and the optical cladding material 306.

FIGS. 5 and 6 show structures which eventually become the waveguide during an intermediate step during the formation of an HAMR head, such as HAMR head 300. The HAMR head and the attendant structures are formed using semiconductor processing techniques. As an overview, the semiconductor processing techniques include depositing a layer of waveguide material onto a substrate, and depositing a layer of a solid material onto the waveguide material. A layer of photoresist is then deposited onto the solid material. The photoresist is exposed to form a pattern which will form a hard mask for the waveguide. After exposing the photoresist to produce the waveguide pattern, the photoresist material not associated with the waveguide pattern is removed. The solid material not below the patterned photoresist is removed with an etching process that selectively removes the solid material. This forms the hard mask for the waveguide that sits on the layer of waveguide material. Another selective etch is applied to the surface. The selective etch removes the waveguide material. The waveguide material below the hardmask is not removed. This leaves the waveguide and hardmask on the substrate. This is the stage of the process shown in FIGS. 5 and 6. In other words, the waveguide and any extra tabs which may be cut off during final processing is positioned on the substrate beneath the hardmask used to form the waveguide and any tabs or extra portions which are removed during subsequent processing. Further details of the process used in this invention will be detailed below.

Now turning to FIGS. 5 and 6, the difference in the waveguides formed by hard masks made of different materials will be discussed. FIG. 5 is an illustration of a waveguide 504 formed using a Cr hard mask 530. Attached to the waveguide 504 is a tab 540 which is used to stabilize the waveguide 504 during processing. The tab 540 is removed at a later time leaving the waveguide 504 as formed. As shown, the waveguide 504 has sidewalls 506 and 508. The sidewalls 506 and 508 are rough. The roughness of the sidewalls 506, 508 is related to the roughness of a first edge 536 and a second edge 538 of the hardmask 530. The edges 536, 538 of the hard mask 530 are substantially immediately above the sidewalls 506, 508 of the waveguide 504. The edges 536, 538, when etched, have a line edge roughness (LER). The line edge roughness (LER) of the edges 536, 538 of the hard mask 530 are transferred downward when the waveguide material is selectively etched with the hard mask 530 in place. Line edge roughness (LER) occurs when making certain features using semiconductor processing techniques. When variations in the width of a resist feature occur quickly over the length of the feature, this variation is called line width roughness. When examining these variations along one edge it is called line edge roughness (LER). LER is caused by a number of statistically fluctuating effects at these small dimensions such as shot noise (photon flux variations), statistical distributions of chemical species in the resist such as photoacid generators, the random walk nature of acid diffusion during chemical amplification, the nonzero size of resist polymers being dissolved during development, and the grain structure of hardmask materials. LER is usually characterized as the 3σ deviation of a line edge from a straight line, though a more complete frequency analysis of the roughness can be valuable as well. The impact of LER on device performance depends on the specific device layer and specific aspects of the device technology. For lithography generations below 100 nm, typical specifications for the 3σ LER are about 5% of the nominal CD. Although this is achievable with masks derived from resist materials, hardmasks that are not polymer based do not necessarily meet this standard. For a given etch technique, such as ion mill (dry etch), reactive ion etch (RIE), or wet etch, a hardmask material is selected that is inert and resistant to the etchant ie the material to be etched has a higher removal rate than the mask material. As such, hardmask materials are wide ranging, and can have grain structure that drive LER to be significantly higher than the specification described above. For many applications, such as nano-scale electronic and optical devices, large LER increases noise and interference, thus reducing performance, which underpins the importance of the hardmask as described herein, where LER meets or exceeds the specifications of the other resist materials, such as Durimide® and HSQ.

The LER shown in FIG. 5 is thought to be the result of the chemical reaction between the Cr hard mask layer and the selective etch used to form it. The Cr layer has a highly-granular crystalline structure, and etches preferentially along those grain boundaries, resulting in the rough sidewalls. The Cr grains are large enough relative to the size of the feature needed to form the hard mask that removal results in LER along the edges 536, 538 of the hard mask 530 formed.

FIG. 6 is an illustration of a waveguide formed using a AlO hard mask, according to an example embodiment. AlO differs from Cr in that AlO has a more amorphous or grainless crystalline formation FIG. 6 includes a hard mask 604 made of an amorphous or noncrystalline solid. The amorphous material hard mask 604 has edges 636 and 638. When the amorphous material hard mask layer is patterned and then a selective etch is applied to the hard mask material, the edges 636, 638 of the hard mask 630 are substantially smooth. By smooth, the line edge roughness (LER) is as good as achievable with the best known resist materials, such as DURIMIDE® and HSQ. The LER of the patterning material is substantially replicated as the hard mask material is etched. The HM material selected does not have a crystalline structure which would limit the LER achievable. Use of the amorphous or noncrystalline material as the hard mask (HM) material allows for substantial replication of the patterned resist material as the removal of material is not limited to crystalline portions. In one embodiment, the waveguide can have a LER in a range of 0.1-3.0 σ deviation of a line edge from a straight line. In other words the line edge roughness (LER) associated with the edges 636, 638 result in a smooth sidewall 606, 608 when a selective etch is applied to remove the waveguide material on the substrate which is unprotected by the hard mask 630.

After forming the waveguide 604 having the smooth edges, the hard mask 630 can be removed. The resulting structures then clad with an optical cladding material 306 (shown in FIG. 3). In this particular embodiment, the optical cladding material 306 is made of the same material as the hard mask 630. In this instance, the hard mask 630 may not be removed. The structure shown in FIG. 6 can be clad with the optical cladding material without removing the hard mask 630 as the materials are the same.

Figure 7:
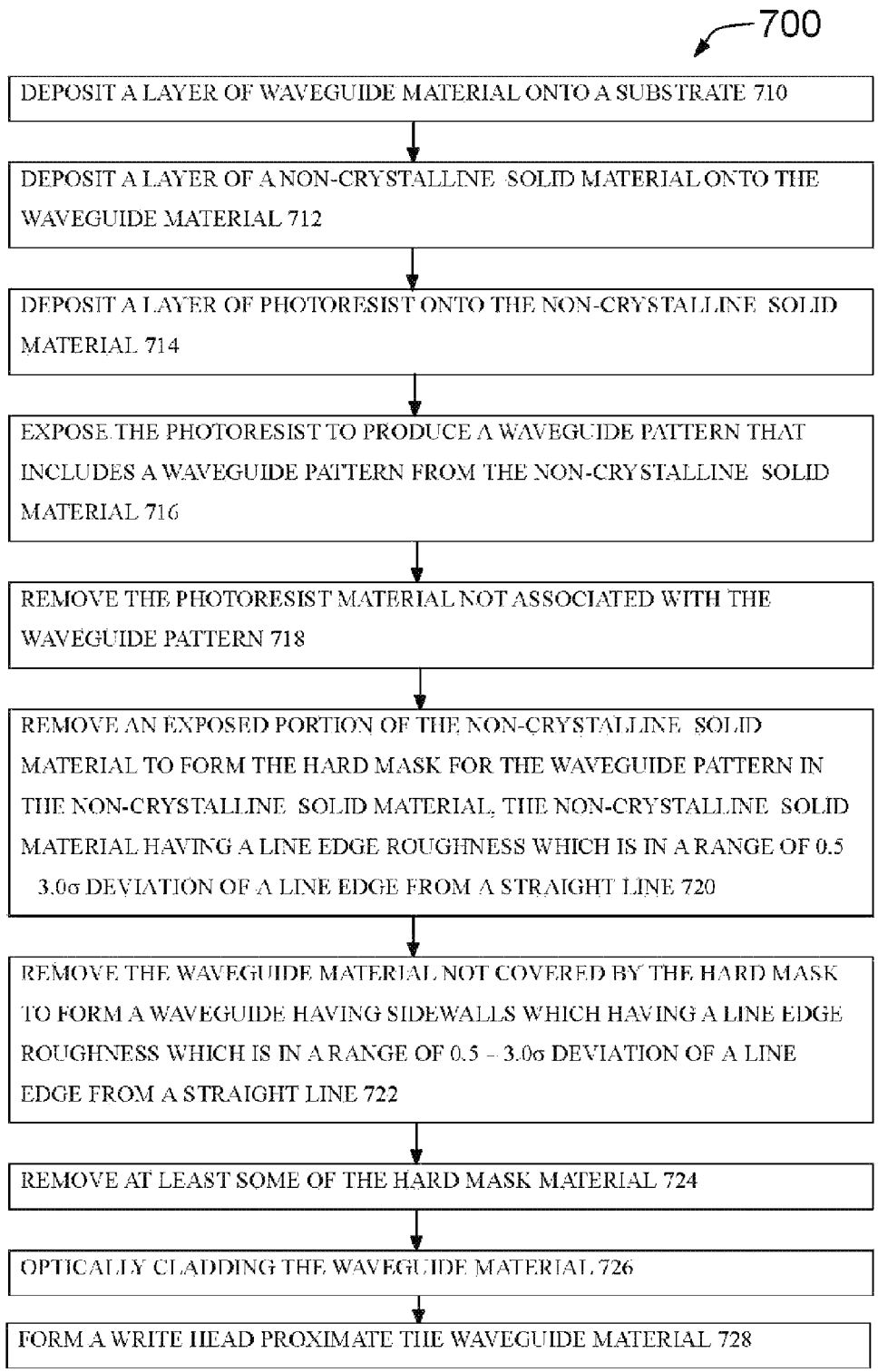
FIG. 7 is a flowchart illustrating an example technique for forming a waveguide using an amorphous hard mask, according to an example embodiment.

FIG. 7 is a flowchart of the process or method 700 for forming an HAMR transducer that includes a waveguide, according to an example embodiment. The method 700 of forming a wave guide for a heat assisted magnetic recording slider of a disk drive includes depositing a layer of waveguide material onto a substrate 710, and depositing a layer of a hard mask material 712 onto the waveguide material. The method 700 then includes depositing a layer of photoresist onto the hard mask material 714, and exposing the photoresist 716 to produce a hard mask pattern that includes a waveguide pattern. The method 700 also includes stripping or removing the photoresist material not associated with the waveguide pattern 718. The photoresist remaining forms the hard mask pattern in the non-crystalline solid material having a line edge roughness which is as good as achievable with the best known resist materials, such as DURIMIDE® and HSQ. In one embodiment, the waveguide can have a LER in a range of 0.1-3.0 σ deviation of a line edge from a straight line. The method also includes removing the non-crystalline material not covered by the photoresist to form the hard mask 720, the hard mask having edges which having a line edge roughness which is as good as achievable with the best known resist materials, such as DURIMIDE® and HSQ. This leaves the hard mask positioned over the layer of waveguide material. The waveguide material not covered by the hard mask is removed 722 to form the waveguide having sidewalls which having a line edge roughness which is as good as achievable with the best known resist materials, such as DURIMIDE® and HSQ. In one embodiment, the waveguide can have a LER in a range of 0.1-3.0 σ deviation of a line edge from a straight line. In some embodiments, hard mask material is amorphous. In still other embodiments the hard mask material is a non-crystalline solid. In one embodiment, the hard mask material is AlO. The method 700 can also include removing at least some of the hard mask material 724. The method 700 also includes removing the waveguide material not below the hard mask. The method also includes optically cladding the waveguide material 726. The hard mask material can be removed before cladding. In another embodiment, the cladding material is substantially the same as the hard mask and so the hard mask is not removed or remains and is then the waveguide material is optically cladded. In one embodiment, the material used to optically clad the waveguide material is AlO. The method 700 also includes forming a write head proximate the waveguide material 728. In one embodiment, a thin film head is formed proximate the waveguide material.

Figure 8:
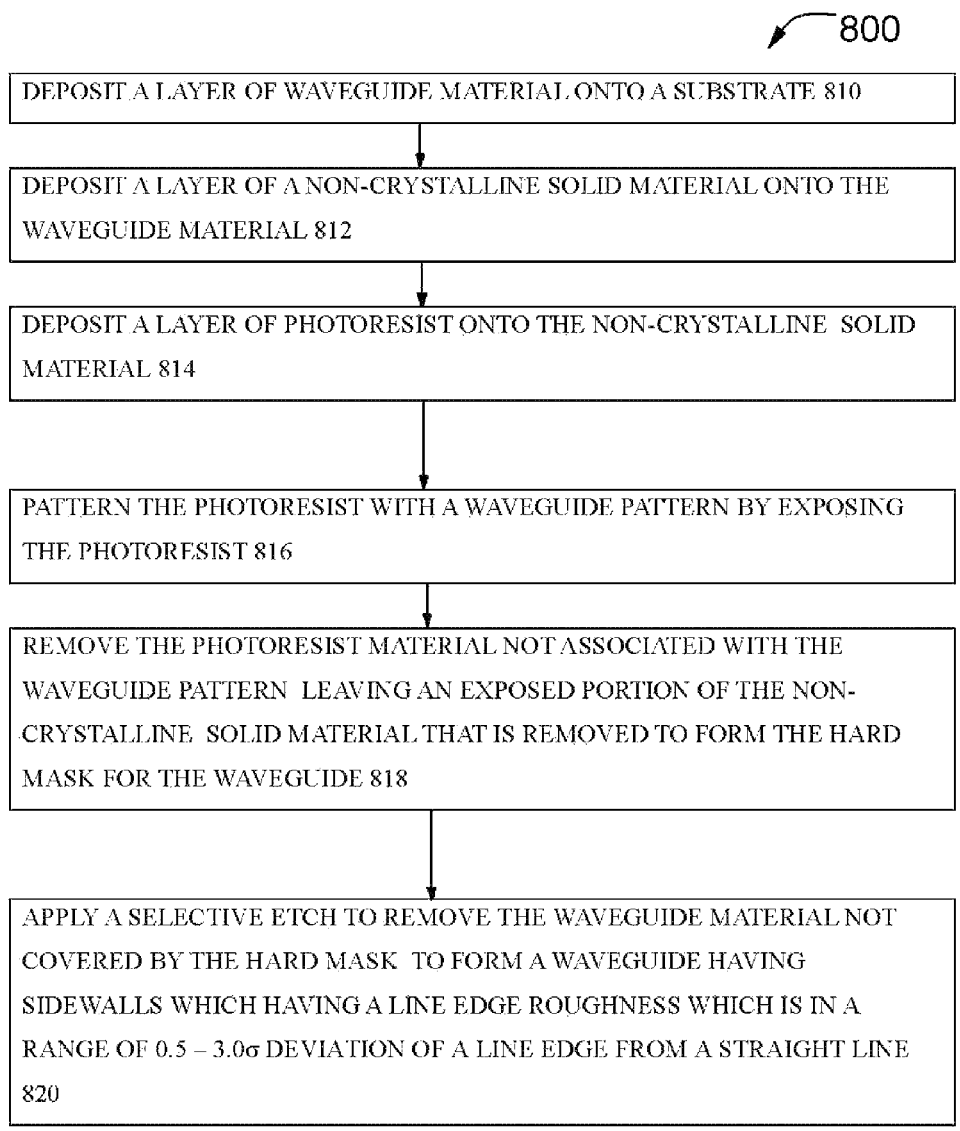
FIG. 8 is a flowchart of another example technique for forming a waveguide using an non-crystalline hard mask, according to an example embodiment.

FIG. 8 is flowchart for another method 800 for forming an HAMR transducer that includes a waveguide, according to an example embodiment. The method of forming a wave guide for a heat assisted magnetic recording slider of a disk drive includes depositing a layer of waveguide material onto a substrate 810, and depositing a layer of a non-crystalline solid material onto the waveguide material 812. A layer of photoresist is then deposited onto the non-crystalline solid material 814. The photoresist is patterned with a waveguide pattern by exposing the photoresist to produce the waveguide pattern 816. The photoresist material not associated with the waveguide pattern is removed 818 leaving an exposed portion of the non-crystalline solid material that is removed to form the hard mask for the waveguide. The non-crystalline solid material is removed using a selective etching process, such as reactive ion etching. The non-crystalline solid material that forms the hard mask has a line edge roughness which is as good as achievable with the best known resist materials, such as DURIMIDE® and HSQ. In one embodiment, the waveguide can have a LER in a range of 0.1-3.0 σ deviation of a line edge from a straight line. Another selective etching process is used to remove the waveguide material not covered by the hard mask 820 to form a waveguide having sidewalls which having a line edge roughness which is as good as achievable with the best known resist materials, such as DURIMIDE® and HSQ. The selective etching process selectively removing the non-crystalline solid material. In one embodiment, the non-crystalline solid material is removed using a Reactive Ion Etch (RIE) selective to the non-crystalline solid material. In one embodiment, the Reactive Ion Etch (RIE) is a dry etching process while in another embodiment, the Reactive Ion Etch (RIE) is a wet etching process. In another embodiment, removing the waveguide material not covered by the hard mask to form a waveguide includes an ion milling process.

Figure 9:
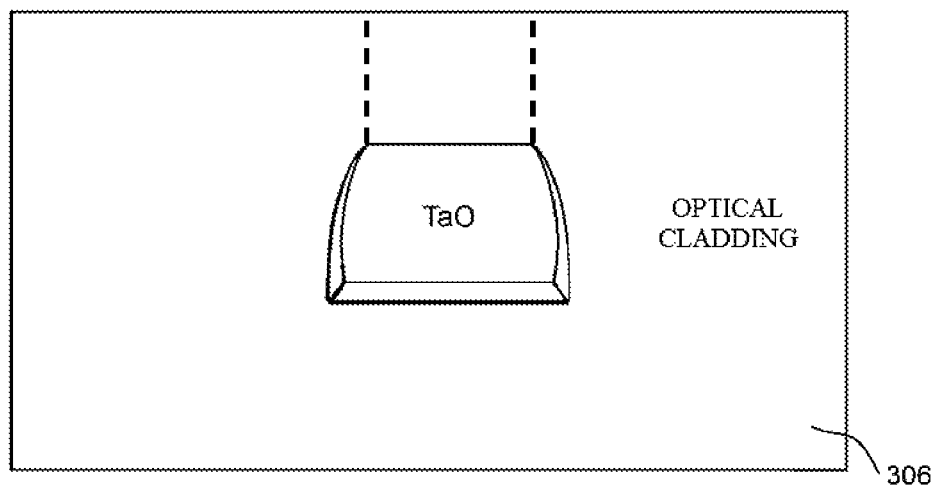
FIG. 9 is a cross sectional view of an optically cladded waveguide, according to an example embodiment.

FIG. 9 is a cross sectional view of an optically cladded waveguide, according to an example embodiment. The waveguide 304, 604 is surrounded by optical cladding material 306. If the optical cladding material is the same as the hard mask material, the hard mask need not be removed. This is shown in FIG. 9 by means of hidden or broken lines that extend between the waveguide and the edge of the optical cladding. In this instance, the hard mask is made of the same material as the optical cladding so the hard mask is not required to be removed. In other instances, where the optical cladding material differs from the material of the hard mask, the hard mask is removed prior to placing the optical cladding. The application of optical cladding material may result in a non planar surface. In some embodiments, the surface can be planed to form a substantially flat surface.

Figure 10:
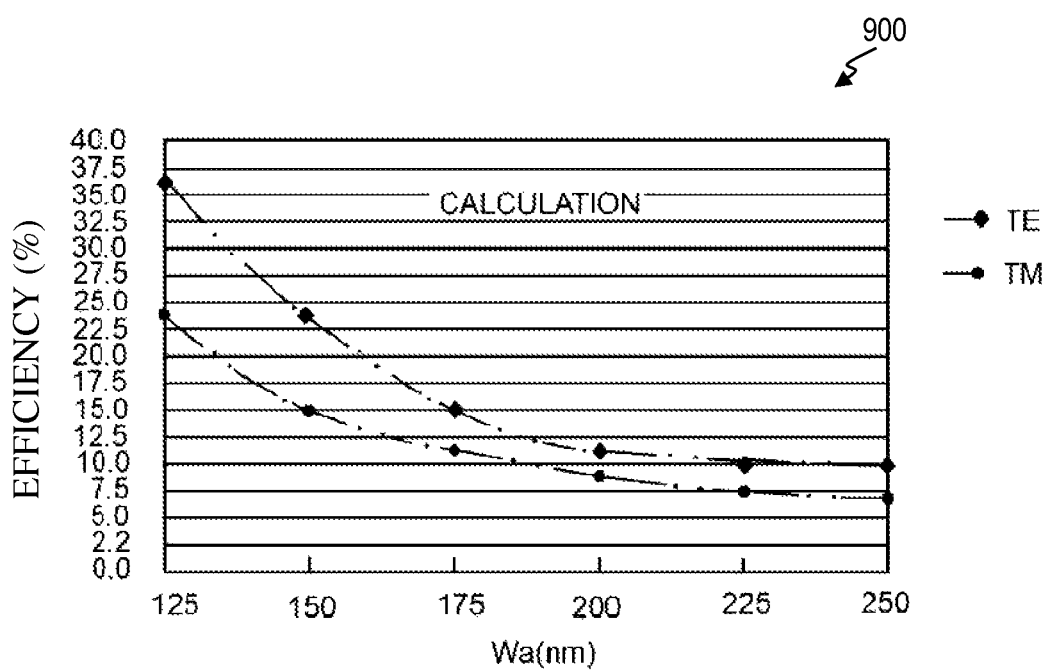
FIG. 10 is a chart illustrating calculated waveguide efficiency.

FIG. 10 is a chart illustrating calculated waveguide efficiency. The chart 900 includes efficiencies for transmissions of light and energy as a function of the width dimension of the waveguide. Two efficiencies are shown. One efficiency is labeled TE (Transverse Electric polarized light), while the other efficiency is labeled TM (Transverse Magnetic polarized light). As shown in FIG. 10, the TE efficiency is about 37.5% when the waveguide has a tip width of approximately 125 nm. Similarly, the TM efficiency is about 24% when the waveguide has a tip width of approximately 125 nm.

Figure 11:
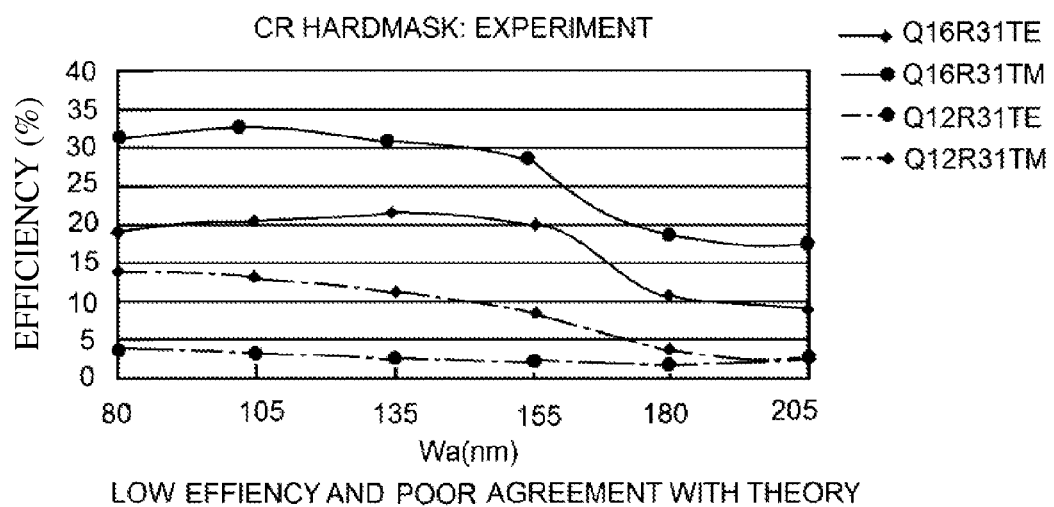
FIG. 11 is a chart illustrating waveguide efficiency for a waveguide made of $Ta_2O_5$ using a Cr hard mask.

FIG. 11 is a chart illustrating waveguide efficiency for a waveguide made of TaO that used a Cr hard mask or crystalline hard mask during fabrication. Again two efficiencies are shown for two tests. The best of these tests is associated with Q 16. As discussed above, the Cr hard mask results in a relatively rough sidewall in the waveguide that is formed (see FIG. 5). When the tip width of the waveguide is 125 nm wide, the TE efficiency is approximately 20% and the TM efficiency is notably higher. This is well below the theoretical or calculated TE efficiency shown in FIG. 9, and also unusual that the TE is less than the TM. Data on another set of devices fabricated with a Cr hardmask are included in this graph, and those results are even further off from expectation. The TE mode has larger overlap with the sidewalls and is, thus, more susceptible to LER, which explains why the TE efficiency, in particular, is pulled down so much in the data of FIG. 10. In summary, when a wave guide is formed with a hard mask made of a granular metal the edges of the hard mask have a line edge roughness (LER) which produces a waveguide having rough sidewalls. The rough sidewalls result in low efficiency and poor agreement with the calculated efficiencies of FIG. 9. It is speculated that the low efficiency is due to the rough sidewalls. The rough sidewalls will allow certain amount of the light energy or energy to leave the waveguide. In other instances the light can reflect off the sidewalls of the waveguide and produce interference with the light passing down the waveguide.

Figure 12:
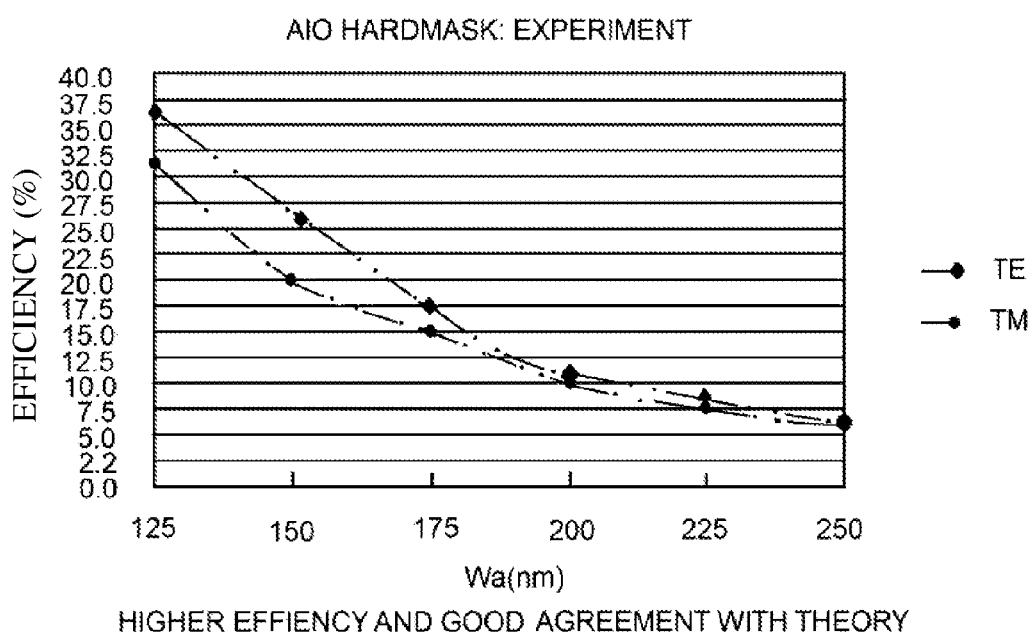
FIG. 12 is a chart illustrating waveguide efficiency for a waveguide made of $Ta_2O_5$ formed by using an $Al_2O_3$ hard mask, according to an example embodiment.

FIG. 12 is a chart illustrating waveguide efficiency for a waveguide made of TaO formed by using an AlO hard mask, according to an example embodiment. The waveguide made of TaO using an AlO hard mask, has efficiencies that are much more aligned with that of the calculated or theorized efficiencies. As shown in FIG. 11, the TE efficiency is approximately 36% for a waveguide having a width of 125 nm, and the TM efficiency is approximately 31% for a waveguide having a width of 125 nm. This basically is much more aligned with the efficiencies as calculated.

An apparatus for forming a wave guide for a heat assisted magnetic recording slider of a disk drive includes means for depositing a layer of waveguide material onto a substrate, and means for depositing a layer of a hard mask material onto the waveguide material. The apparatus also includes means for depositing a layer of photoresist onto the hard mask material, and means for exposing the photoresist to produce a hard mask pattern that includes a waveguide pattern. The apparatus also includes means for stripping the photoresist material leaving the hard mask pattern having a line edge roughness which is as good as achievable with the best known resist materials, such as DURIMIDE® and HSQ. In one embodiment, the waveguide can have a LER in a range of 0.1-3.0 σ deviation of a line edge from a straight line, and means for removing the waveguide material not covered by the hard mask, the waveguide having sidewalls which having a line edge roughness which is as good as achievable with the best known resist materials, such as DURIMIDE® and HSQ.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A waveguide formation method for a heat assisted magnetic recording slider of a disk drive, comprising:
   depositing a layer of waveguide material onto a substrate;
   depositing a layer of a hard mask material onto the waveguide material, wherein the hard mask material comprises $Al_2O_2$;
   depositing a layer of photoresist onto the hard mask material;
   exposing the photoresist to produce a hard mask pattern that includes a waveguide pattern;
   stripping the photoresist material leaving the hard mask pattern having a first line edge roughness; and
   removing the waveguide material not covered by the hard mask pattern to form a waveguide having sidewalls which having a second line edge roughness which is substantially the same as the first line edge roughness associated with the hard mask pattern.

2. The method of claim 1, wherein the hard mask material is amorphous.

3. The method of claim 1, wherein the method further comprises removing the hard mask pattern.

4. The method of claim 3, wherein the method further comprises optically cladding the waveguide material.

5. The method of claim 1, wherein the method further comprises optically cladding the waveguide material.

6. The method of claim 5, wherein the material used to optically clad the waveguide material is AlO.

7. The method of claim 1, further comprising forming a thin film head proximate the waveguide material.

8. The method of claim 1, wherein the waveguide is formed proximate a material that will form a write heat for the heat assisted magnetic recording slider.

9. A waveguide formation method for a heat assisted magnetic recording slider of a disk drive, comprising:
   depositing a layer of waveguide material onto a substrate;
   depositing a layer of a non-crystalline solid material onto the waveguide material, wherein the non-crystalline solid material comprises $Al_2O_3$;
   depositing a layer of photoresist onto the non-crystalline solid material;
   exposing the photoresist to produce a waveguide pattern that includes a waveguide pattern from the non-crystalline solid material;
   removing the photoresist material not associated with the waveguide pattern to form a waveguide pattern having a first line edge roughness;
   removing an exposed portion of the non-crystalline solid material to form the hard mask for the waveguide pattern in the non-crystalline solid material, the non-crystalline solid material having a second line edge roughness which is substantially equal to the first line edge roughness; and
   removing the waveguide material not covered by the hard mask to form a waveguide having sidewalls which having a line edge roughness which is substantially equal to the first line edge roughness.

10. The method of claim 9, wherein the exposed portion of the non-crystalline solid material is removed using a selective etching process to form the hard mask, the selective etching process selectively removing the non-crystalline solid material.

11. The method of claim 9, wherein the exposed portion of the non-crystalline solid material is removed using a Reactive Ion Etch (RIE) selective to the non-crystalline solid material.

12. The method of claim 11, wherein the Reactive Ion Etch (RIE) is a dry etching process.

13. The method of claim 11, wherein the Reactive Ion Etch (RIE) is a wet etching process.

14. The method of claim 9, wherein removing the waveguide material not covered by the hard mask to form a waveguide includes another selective etching process.

15. The method of claim 14, wherein removing the waveguide material not covered by the hard mask to form a waveguide includes a Reactive Ion Etching (RIE) process.

16. The method of claim 14, wherein removing the waveguide material not covered by the hard mask to form a waveguide includes an Ion Milling process.

17. The method of claim 9, wherein the waveguide is formed proximate a material that will form a write heat for the heat assisted magnetic recording slider.

18. A waveguide formation method for a heat assisted magnetic recording slider of a disk drive, comprising:
- depositing a layer of waveguide material onto a substrate;
- depositing a layer of a hard mask material onto the waveguide material, wherein the hard mask material comprises $Al_2O_3$;
- depositing a layer of photoresist onto the hard mask material;
- exposing the photoresist to produce a hard mask pattern that includes a waveguide pattern;
- stripping the photoresist material leaving the hard mask pattern having a first line edge roughness (LER) in a range of 0.1-3.0 σ deviation of a line edge from a straight line; and
- removing the waveguide material not covered by the hard mask pattern to form a waveguide having sidewalls which having a second line edge roughness which is substantially the same as the first line edge roughness associated with the hard mask pattern.

* * * * *